(12) United States Patent
Burgdorf et al.

(10) Patent No.: US 6,650,986 B1
(45) Date of Patent: Nov. 18, 2003

(54) AUTOMOTIVE VEHICLE CONTROL SYSTEM

(75) Inventors: Jochen Burgdorf, Offenbach (DE); Helmut Fennel, Bad Soden (DE); Peter Lohberg, Friedrichsdorf (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/890,707

(22) PCT Filed: Jan. 27, 2000

(86) PCT No.: PCT/EP00/00627

§ 371 (c)(1),
(2), (4) Date: Nov. 2, 2001

(87) PCT Pub. No.: WO00/46088

PCT Pub. Date: Aug. 10, 2000

(30) Foreign Application Priority Data

Feb. 5, 1999 (DE) .......................................... 199 04 818
Sep. 15, 1999 (DE) .......................................... 199 44 090

(51) Int. Cl.[7] .............................................. G06F 19/00
(52) U.S. Cl. .......................................... 701/70; 701/71
(58) Field of Search .............................. 701/29, 34, 70, 701/71, 76, 78, 92; 340/438, 441; 324/166; 73/1.81

(56) References Cited

U.S. PATENT DOCUMENTS

| | | | |
|---|---|---|---|
| 4,779,702 A | | 10/1988 | Filsinger et al. |
| 4,947,325 A | * | 8/1990 | Iwata et al. ..................... 701/34 |
| 5,343,396 A | * | 8/1994 | Youngblood ................. 701/34 |
| 5,642,280 A | * | 6/1997 | Negrin et al. ................. 701/34 |
| 5,684,702 A | * | 11/1997 | Phillips et al. ................. 701/78 |
| 5,922,038 A | * | 7/1999 | Horiuchi et al. .............. 701/34 |
| 5,926,017 A | * | 7/1999 | Von Grünberg et al. .... 324/166 |
| 6,122,577 A | * | 9/2000 | Mergenthaler et al. ....... 701/34 |
| 6,223,107 B1 | * | 4/2001 | Mergenthaler et al. ....... 701/34 |
| 6,304,802 B1 | * | 10/2001 | Stuible et al. ................. 701/29 |
| 6,370,938 B1 | * | 4/2002 | Leimbach et al. ............ 73/1.81 |
| 6,427,102 B1 | * | 7/2002 | Ding ............................. 701/34 |
| 6,434,457 B2 | * | 8/2002 | Okita et al. ................... 701/34 |
| 2001/0027362 A1 | * | 10/2001 | Nishida et al. ............... 701/34 |
| 2002/0091472 A1 | * | 7/2002 | Jager et al. ................... 701/34 |

FOREIGN PATENT DOCUMENTS

| | | |
|---|---|---|
| DE | 41 12 738 | 10/1992 |
| DE | 44 35 160 | 4/1996 |
| DE | 196 22 698 | 12/1996 |
| DE | 196 20 581 | 11/1997 |
| DE | 196 20 582 | 11/1997 |
| DE | 196 24 795 | 1/1998 |
| DE | 196 26 843 | 1/1998 |
| EP | 0 828 161 | 3/1998 |
| EP | 0 918 003 | 5/1999 |

OTHER PUBLICATIONS

Search Report of the German Patent Office for Application No. 199 04 818.5.

* cited by examiner

*Primary Examiner*—Gary Chin
(74) *Attorney, Agent, or Firm*—Rader, Fishman & Grauer PLLC

(57) ABSTRACT

The present invention relates to an automotive vehicle control system, preferably comprising a control logic with at least two control functions, such as ABS and YTC functions, with a tire sensor (tire wall torsion sensor or SWT), i.e., with at least one pick-up for measuring data fitted stationarily on the vehicle body, e.g. a spring strut of a vehicle wheel, and cooperating with at least one encoder applied to the tire wall and co-rotating with the wheel or tire, and with at least one conventional rotational speed sensor that is mounted on the wheel, for example, on the wheel bearing, and includes a measuring data emitter and a pick-up for measuring data, wherein the output information or output signals of the tire sensor and the at least one conventional sensor are correlated and evaluated in an electronic evaluating circuit of the control system to determine vehicle condition variables by means of forces that act on the individual wheels and tires.

12 Claims, 5 Drawing Sheets

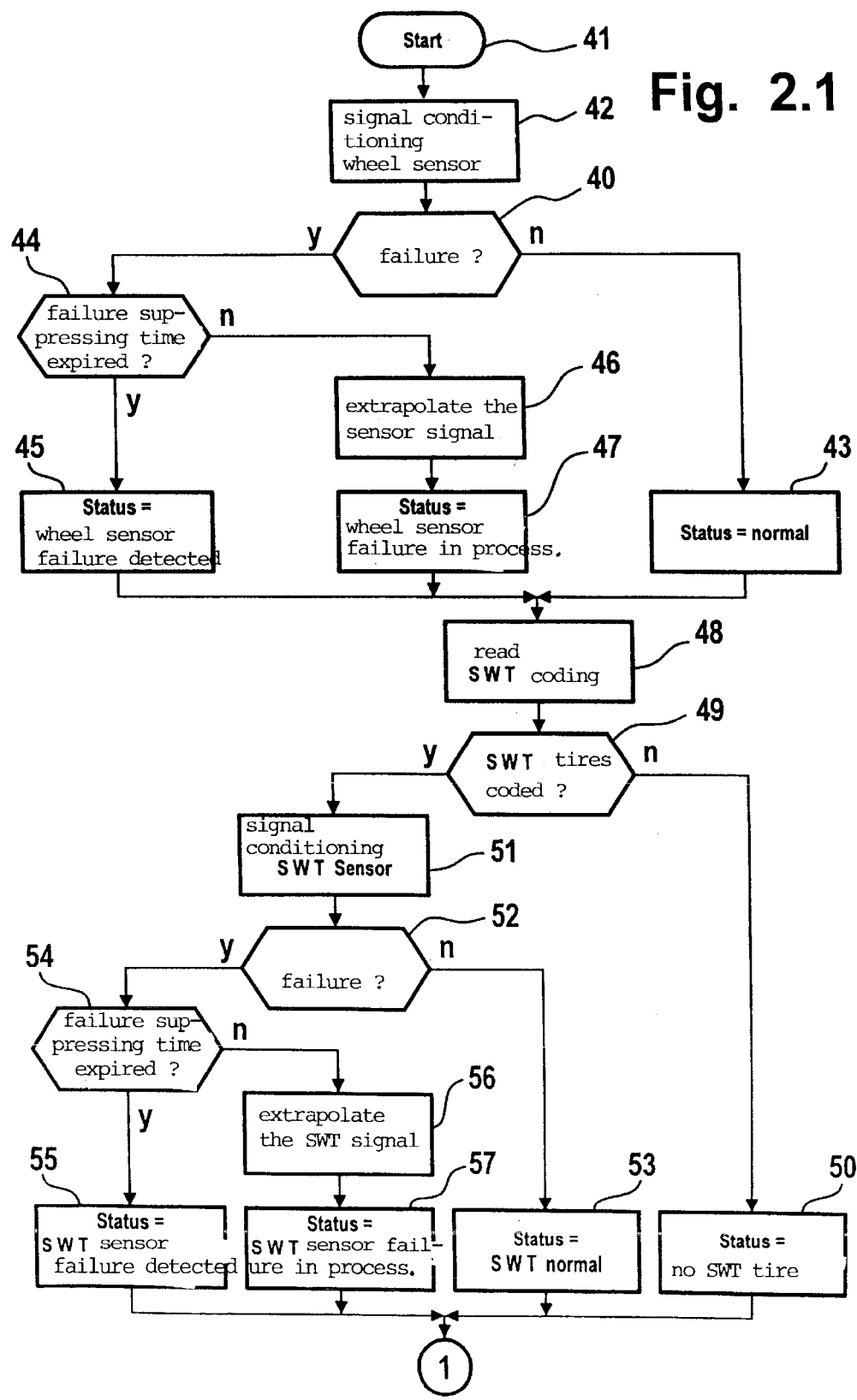
Fig. 2.1

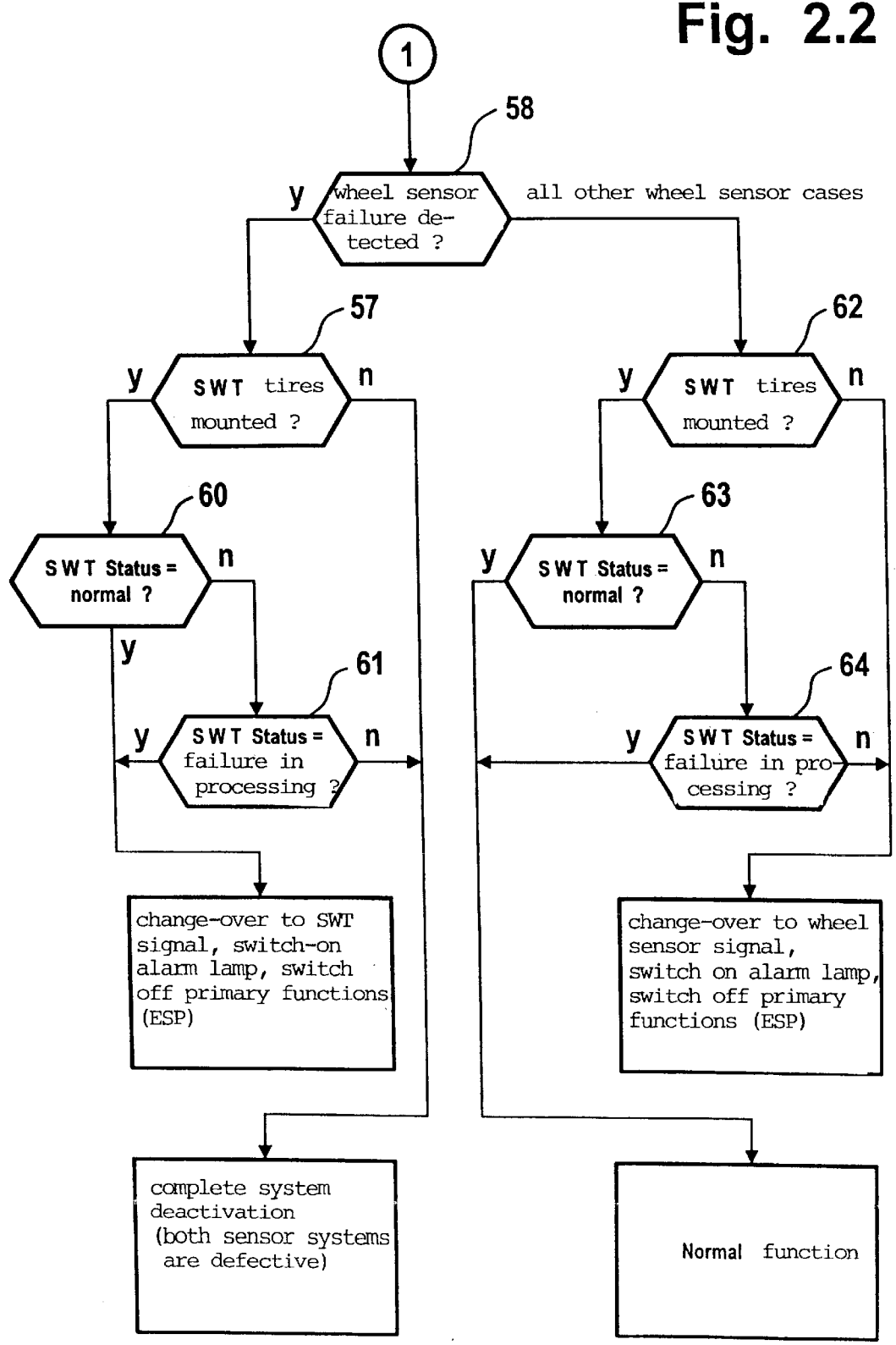
Fig. 2.2

AUTOMOTIVE VEHICLE CONTROL SYSTEM

TECHNICAL FIELD

The present invention generally relates to an automotive vehicle control system and more particularly relates to techniques for determining the accuracy of a sensor output signal.

BACKGROUND OF THE INVENTION

In automotive vehicle control systems which include at least two control functions, such as ABS (anti-lock system) or ABSplus and YTC (yaw torque control), it is known in the art to determine (by means of so-called tire sensors (tire wall torsion sensor or SWT)) the forces which act upon the tire during the tire rotation from the torsional deformation of the tire (depending on the position of the sensor) between a radially inward area of the tire or the hub and a radially outside area of the tire in at least one non-rotating position (WO 96/10505). At least one emitting element is provided in the side wall of the tire for this purpose according to DE 44 35 160 A1 to which is assigned at least one pick-up for measuring data that is stationarily fitted on the vehicle chassis, and a second emitter/pick-up pair for measuring data which can be configured as a conventional wheel speed sensor. In these conventional wheel speed sensors, the emitter is attached to the wheel bearing. Due to this dual pick-up arrangement, a phase change takes place between the output signals of each pick-up when the tire is deformed as a result of the forces that act upon the tire. In addition to the phase evaluation, it is also possible to evaluate the signal amplitude which provides an indication of the side wall deformation of the tire.

Further, DE 196 26 843 A1 discloses determining the rotational frequency of the tire tread by means of a tire sensor and the rotational frequency of the brake drum or brake disc by means of a conventional wheel speed sensor and evaluating the measured values individually and then comparing these results to each other. The sensors employed and their measurement results are used to determine slip in ABS or TCS functions.

In WO 97/44673, two locally offset sensors or pickups are used to measure rotational or angular movements, which reflect the torsional stress of the tire or the tire wall. The movements are in turn used to calculate the torques transmitted to the tire or the coefficient of friction experienced by the tire.

An object of the present invention is to provide an automotive vehicle control system which uses a tire sensing system in conjunction with 'normal', emitter-less tires (i.e., tires without coded side walls or magnetic areas).

The automotive vehicle control system according to the present invention includes a sensor assembly which is comprised of one (or more) pick-up(s) for measuring a tire code, and one conventional rotational speed sensor (e.g. mounted on the wheel bearing). This system permits sensing longitudinal and lateral forces on the tire and, further, the rotational speeds (as with up-to-date side wall torsion sensors (SWT)) and evaluating them for vehicle control. In this arrangement, the output signals representative of the rotational speeds, for example, the rotational frequencies of the tire sensor and the conventional wheel speed sensor known in prior art are determined and related to each other so that deviations of one signal from the other signal are detected, if necessary, in connection with further information or signals.

The automotive vehicle control system of the present invention preferably includes a tire sensor, a wheel rotational speed sensor means for examining the output signals generated by said sensors. Depending on the evaluated output signals of the sensors (or on vehicle condition variables derived therefrom), the vehicle control system automatically adapts the control logic of the automotive vehicle control system such that the YTC function is changed over to at least the ABS or ABSplus function in the presence of the only one signal which represents a wheel rotational speed or wheel rotational frequency. This ABS or ABSplus function and further secondary functions require the vehicle condition variables which are generated by the forces that act on the individual wheels and tires only for improving the function, rather than for the operability, as is the case with the YTC driving stability function.

The operability of the control logic and, thus, of the ABS or ABSplus, TCS, EBD, and EDC functions, and the YTC function can be established by using substitute signals or substitute values generated by models from the existing sensor signals based on physically different quantities, when a malfunction is detected by one of the two sensors. One such way of generating substitute values is to compare the rotational speeds of the tire sensor with those of the conventional rotational speed sensor. A malfunction detected may be due to a defect of the conventional sensor or the tire sensor, or due to tires on or in the side wall of which no magnetic areas or poles are provided which can be scanned by the pick-ups for measuring data.

To determine the sensor or pick-up for measuring data where malfunction occurs, favorably, a magnetic coding that contains scannable recordings as to whether the tire is configured as a tire sensor is favorably applied to the tire wall. It is ensured by this provision that when discrepancies between the tire signal and the conventional sensor signal are detected, the output signal of the sensor or the pick-up for measuring data can be examined which provides the signal for the wheel rotational frequency. In addition to the continuous detection which is also intended to detect the defect of the inside sensor, it is achieved that the possibly disturbed tire sensor can be identified instantaneously upon starting to drive.

In a particularly advantageous way, the comparison of the output signals of the tire sensor and the conventional sensor is effected by way of the number of their poles which are interrelated in a fixed predetermined ratio. Thus, the redundant sensor assembly made up of tire sensor and conventional sensor renders it possible with respect to the wheel rotational frequency to detect sensor faults clearly, i.e., without the assistance of plausibility criteria, and test stimuli. When deviations are found over a defined period of time, an automatic change-over to the functioning sensor takes place as well as an adaption of the control logic to the automotive vehicle control system.

The adaption of the control logic of the automotive vehicle control system (ABS, TCS, EDC, and YTC or ESP, or similar systems) which utilizes the information furnished by the sensors or pick-ups for measuring data and employed in the automotive vehicle control system is carried out automatically by way of the examined or compared wheel rotational frequencies and further information, if available. Thus, the control logic is conformed to the existing or mounted tires, (i.e. either to a normal tire or to a magnetically coded tire) because the output signals which result from the test or comparison of the rotational speeds furnished by the two sensors or pick-ups for measuring data are used to generate error and tire characteristic information, especially information relating to the presence or absence of magnetically coded tires are used on the vehicle.

Due to the fact that the control logic determines whether the output signals lie in a predetermined tolerance band and acts upon deviations only if they lie outside the tolerance band, deviations of the output signals are ignored which are based on the forces acting upon the tire that can cause displacement of the tire on the wheel rim. In addition, insignificant deviations between the output signals of the conventional sensor and the pick-up for measuring data which are not due to different wheel rotational frequencies are filtered.

Preferably, the automotive vehicle control system provides for a determination and/or compensation of the shift of the phase marks or the poles between the tire sensor and the one conventional sensor during predetermined driving conditions by means which are effective for correcting the displacement of the tire on the rim. The phase position is e.g. determined by a learning method which is measured during constant stable driving or at constant driving speed of the vehicle. Because the side wall deformation is reproduced as a result of the forces which are produced by positive or negative acceleration of the wheel, and these quantities are thus in a fixed interrelationship, it is possible to correlate the acceleration measured by a sensor to the phase shift and, thus, compensate a possibly occurring fault. Further, the derivative of the phase signal can be made use of in the event of abrupt changes.

A distinction can be made between the following strategies for the driving conditions:
1. driving at constant speed without acceleration or deceleration
2. accelerated driving
3. accelerated driving with TCS intervention (TCS Traction Slip Control system)
4. decelerated driving
5. decelerated driving with ABS intervention (ABS anti-lock system)
6. ESP intervention (Electronic Stability Program).

The phase shift of the two sensor signals is sensed and stored at constant speeds. This determines a basic offset which can be updated at constant driving. When deviations of the phase shift between the two sensor signals, i.e., the signals of the wheel sensor and the tire sensor, are detected at positive or negative acceleration, and the said deviations lie above a predetermined threshold value or outside a tolerance band, a relative movement between the tire and the rim is assumed which can be corrected by means of correction factors or in dependence on the phase shifts sensed at the 'other' wheels. In a traction slip or ESP intervention, the coefficient of friction is determined in addition, the influence of which on the sensing of the relative movement between tire and rim must be separated in the driving conditions 3, 5, and 6. The coefficient of friction can be determined by way of the brake characteristic (for example, surface of the brake piston, number of pistons per wheel brake, coefficient of friction between disc and brake lining, and similar factors) and by way of the brake pressure calculated on the basis of a pressure model.

BRIEF DESCRIPTION OF THE DRAWINGS

FIGS. 2.1 and 2.2 is a logic flow chart of the sensor fault detection logic according to the present invention, with the detection relating to whether a coded tire is provided on the vehicle.

DETAILED DESCRIPTION OF THE PREFERRED EMBODIMENT

Figure 1:
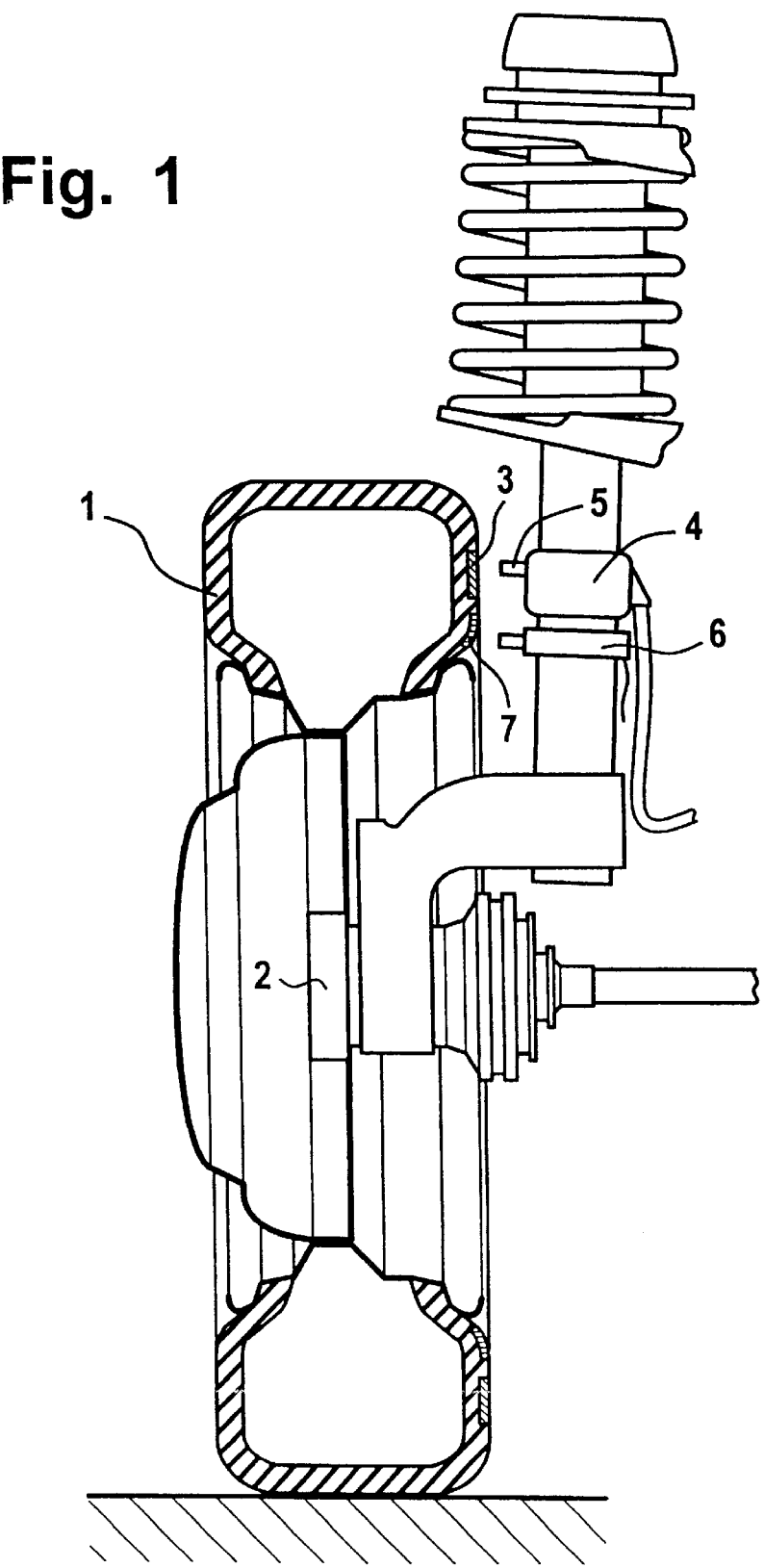
FIG. 1 is a diagrammatic view of a sensor assembly of the automotive vehicle control system of the present invention.

FIG. 1 shows a sensor assembly (3 through 7) associated with the automotive vehicle control system. Reference numeral 3 refers to an encoder fitted to or inserted in the tire side wall, the counterelements of which encoder is a ring that is comprised of magnetic areas or poles and preferably magnetized, or a magnetized coded track. The magnetized areas or poles which are evenly distributed over the periphery of the tire 1 are scanned by at least one pick-up for measuring data which is fitted stationarily on the chassis, e.g. a spring strut of a vehicle wheel, and output signals are produced. Furthermore, at least one additional conventional rotational speed sensor 2 or wheel sensor, which comprises an emitter and a pick-up for measuring data and is 'independent' of the tire is provided on the wheel 1, e.g., on the wheel bearing. The measuring data emitter of the conventional rotational speed sensor 2 is preferably designed having teeth and tooth gaps or poles, which latter are evenly distributed over the periphery of the wheel and scanned by an inductive transducer.

As is shown in FIG. 1, the two pick-ups for measuring data are arranged so as to be offset, the pick-up 5 is placed on an outside ring and the pick-up of the rotational speed sensor 2 on an inside concentric ring. The pick-ups for measuring data which are offset by a distance, with each wheel rotation supply signals, e.g. offset in time, from which the rotational behavior (rotational speed, acceleration, deceleration, and direction of rotation) of the wheels can be calculated or detected.

When drive moments or brake moments are applied to the wheel, the tire 1 is deformed due to the forces which act upon the tire. Under the effect of the forces, the tire wall and, thus, the poles or the magnetized areas of the encoder 3 are deformed in a torsional direction. Due to this torsionally induced deformation, there is a relative local offset of the poles with respect to the pick-ups for measuring data 2 and 5. The result of this variation is a variation of the phase position of the output signals of the pick-ups for measuring data 2, 5 which are correlated and evaluated in an electronic evaluating circuit 4 for determining vehicle condition variables on the basis of the forces that act upon the individual wheels.

Further, a magnetic coding is applied to the tire wall and includes scannable recordings 7 about whether the tire has magnetic areas, that is, is designed as a tire sensor. The recordings 7 are scanned by a reading device 6 and sent to the evaluating circuit. In a preferred embodiment, the pick-up for measuring data 5 is used as the reading device.

The sensor fault detection is the subject matter of FIG. 2. A distinction can be made between four different control functions or system functions which depend upon the sensor assembly illustrated in FIG. 1.

<1> change-over to the tire sensor signal. Switch on alarm lamp. Switch off superordinate ESP or YTC function.

<2> change-over to the wheel sensor signal. Switch on alarm lamp. Switch off superordinate ESP or YTC function.

<3> System deactivation (wheel and tire sensor systems defective). Switch on alarm lamp.

<4> Normal function. Function of all systems of the control logic of the automotive vehicle control system.

Starting from a given situation to be determined, it is initially—after the start 41 of a signal conditioning 42 of wheel sensor 2—found out in block 40 whether a failure condition is present. When the rotational speed signal of the wheel sensor lies within a tolerance band in relation to the signals of the other wheels or above a threshold value, there is no failure, and it is assumed that the rotational speeds sensed by the wheel sensor 2 are correct. A normal status 43 is assumed. In the absence of a rotational speed signal or when the rotational speed signal lies outside the tolerance band or below a threshold value, it is assumed that a failure exists. The faulty wheel speed signal is suppressed according to a time function in block 44 in order to filter out accidentally appearing spurious signals. If the failure still continues after lapse of the time function, a wheel sensor fault 45 is assumed. If the failure disappears within the time function, the sensor signal is extrapolated in 46 and the wheel sensor failure is processed in 47 with regard to the normal status.

With each wheel rotation a magnetic coding is scanned by a reading device in 48 which contains recordings about whether the tires includes magnetic areas, i.e., is configured as a tire sensor. Block 49 determines whether the vehicle is equipped with sensor. In the absence of a scannable recording, the tire is without magnetic areas. In 50, the status is assumed that no tire sensor is mounted on the vehicle. When the reading device reads in the code provided for tire sensors, the tire sensor signal conditioning unit 51 is started, and it is initially determined in block 52 whether a failure exists. When the rotational speed signal of the tire sensor lies within a tolerance band with respect to the signals of the other wheels or above a threshold value, there is no failure, and it is assumed that the rotational speeds sensed by the tire sensor 3, 5 are correct. A normal status 53 is assumed. In the absence of a rotational speed signal, or when the rotational speed signal lies outside the tolerance band or below a threshold value, failure is assumed. The signal generated from sensor 3, 5 is suppressed according to a predetermined time function in block 54 to filter out accidentally appearing spurious signals. When the failure still continues after lapse of the time function, a tire sensor fault 55 is assumed. If the failure disappears within the time function, the sensor signal is extrapolated in 56 and the wheel sensor failure is processed in 57 with regard to the normal status.

Step 58 comprises the above-described cases of the sensor fault detection. A polling is made whether a wheel sensor failure was detected. In the presence of a wheel sensor failure, a polling is performed in block 59 whether a tire with tire sensor 3, 5 exists. When there is a tire sensor with the status normal, i.e., without sensor fault, polled in block 60, an automatic change-over to the control function or system function <1>(as described earlier) will be made. However, if it is determined in block 60 that the normal status does not prevail, a polling is made in block 61 whether the status 59, i.e., the failure, undergoes processing or not. When the failure is being processed, change-over to the control function <1> will take place, when the failure is not being processed, change-over to control function <3> takes place.

In all other wheel sensor cases, if no wheel sensor failure is determined in step 58, the polling will be performed in block 62 to determine whether there is a tire with tire sensor. When a tire sensor is provided or mounted on the one of the vehicle tires, and when the normal status is confirmed in block 63, change-over to control function <4> will take place. If it is found out in block 62 that no tire with tire sensor is provided, change-over to control function <2> takes place. If, however, a tire with tire sensor is provided, but the normal status is not confirmed in block 63, a polling is made in block 64 to determine whether the failure is being processed or not. In the absence of processing of the failure, change-over to control function <2> is made, and in the presence of a failure, there will be a change-over to control function <3>.

Figure 3:
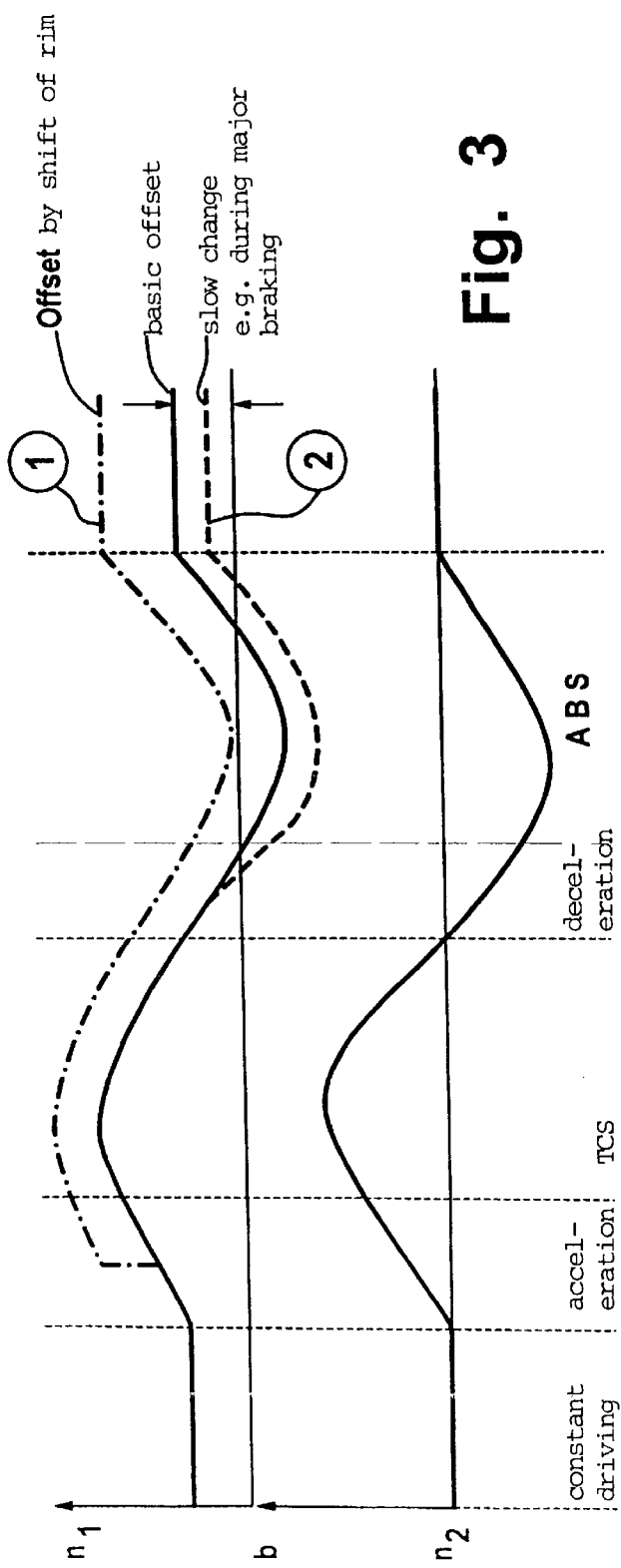
FIG. 3 is a graph of the variation of a shift of the poles of the conventional sensor compared to the tire sensor.
Figure 4:
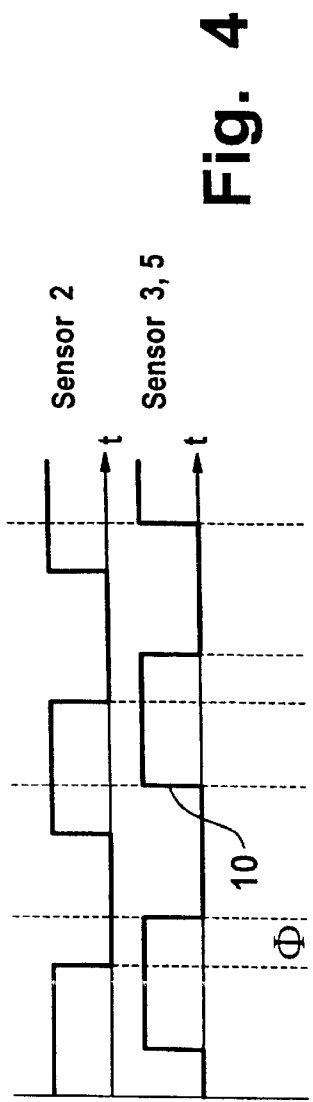
FIG. 4 is a graph of the phase shift angle of sensors 2, 3 and 5.

FIG. 3 schematically shows the course of the shift of the poles of the tire in relation to the poles of the conventional sensor which can ensue from a movement of the tire on the rim. Six driving conditions or operating conditions of the vehicle are plotted on the abscissa, and on the ordinate the wheel rotational speeds or frequencies $n1$, $n2$ of a wheel which are determined by means of the tire sensor 3, 5 and the conventional sensor 2, e.g. by counting and adding pulses, are plotted exemplarily. In the initial condition, i.e., during constant driving, the signals are usually out of phase. The phase shift may occur during constant driving and/or is predetermined already by an offset arrangement of the sensors (the sensors are not disposed in a phase plane). The acceleration of the vehicle may cause movement of the tire on the rim which shows offset in time at the output signal 10 of the tire sensor 3, 5 (FIG. 4). The phase shift angle $\Phi$ is schematically illustrated in FIG. 4. The basic offset displaces in relation to the wheel rotational speeds sensed with the conventional rotational speed sensor and is maintained during the driving condition 'acceleration'. With commencing TCS (traction slip control) and a deceleration, there may occur an opposite movement of the tire so that the basic offset will change again.

The individual shifts of the output signals of the pick-up for measuring data 3, 5 with respect to the output signals of the conventional sensor 2 are compensated by strategies which depend on the driving conditions.

The detection of the relative displacement of the tire on the rim is based on the following observations.

A phase shift between the two signals of the sensors is usually likely to occur during constant driving.

This phase shift is measured and stored. This defines the basic value (basic offset).

During acceleration of the vehicle occurs a deformation of the tire permitting the calculation of forces which are produced corresponding to the coefficient of friction between the tire contact area and the roadway. The same applies to the brake operation.

The assumption is made that the sliding of the tire relative to the rim can occur both abruptly and slowly continuously.

A distinction can be made between the following cases:
1. driving at constant speed without acceleration or deceleration
2. accelerated driving
3. accelerated driving with TCS intervention (TCS= Traction Slip Control system)
4. decelerated driving
5. decelerated driving with ABS intervention (ABS=anti-lock system)
6. ESP intervention (Electronic Stability Program).

In a constant, stable driving operation (normal driving, case 1, it is always possible to ascertain and preferably store the basic value (basic offset). During accelerated or decelerated driving (cases 2 or 4), or in other words, in a positive or negative acceleration, preferably, a linear approach between the positive or negative acceleration and the phase shift can be produced. The correlation between acceleration and phase shift which is linear in the simplest case is also utilized to determine the longitudinal forces. When phase shifts are found which exceed a threshold value or limit value or lie outside a tolerance band, this permits the conclusion of a relative movement between tire and rim. The measured phase shift is then corrected by correction factors, for example, by an estimated amount. The correct value is confirmed and memorized during the subsequent constant travel.

In another design variation, the phase shift is evaluated in comparison with the phase shifts of the other wheels. It should then be assumed that variations in the phase frequency characteristic on the inside or outside radius will not occur simultaneously and uniformly on all four wheels. The drift or the sudden offset can be detected and compensated by means of majority criteria.

The detection and compensation of the relative movement of the tire to the rim will occur in cases 3, 5, and 6 generally as has been described hereinabove. However, the effect of the force (brake force) should be taken into account which is introduced into the automotive vehicle control system, or into the wheel brake.

The effect of the coefficient of friction can be separated by way of the stored, vehicle-related or brake-related values of the brakes (brake characteristics) and by way of the pressure calculated by means of the pressure model, and the procedure can be effected as described hereinabove.

Figure 5:
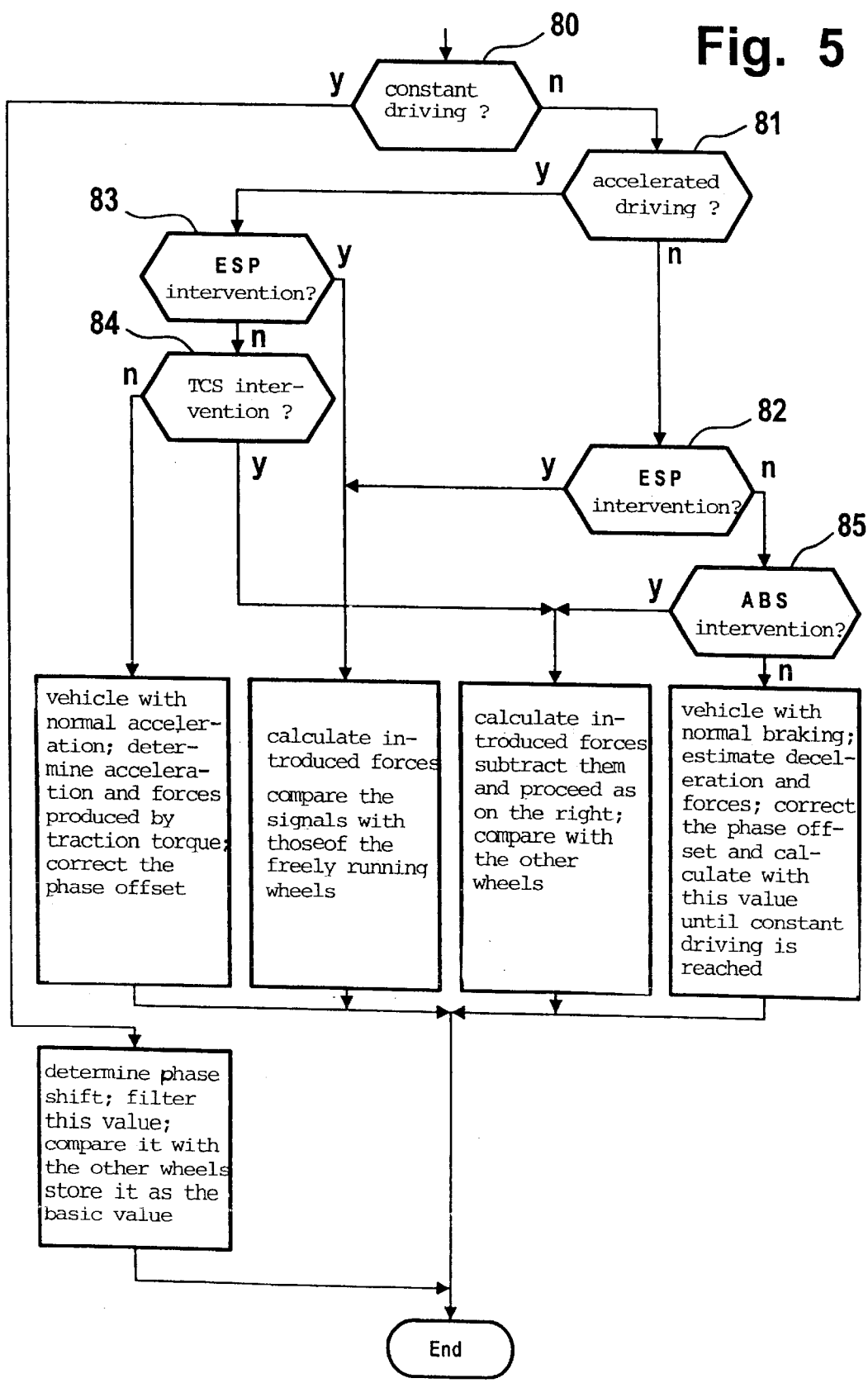
FIG. 5 is a logic flow chart showing the disclosed logic for determining relative movement between the vehicle tire and its respectively associated rim.

FIG. 5 shows the control logic for a preferred embodiment for detecting the relative movement between tire and rim. To this end, a polling is initially made in block 80 whether driving at constant speed prevails. When constant driving prevails, the phase shift of the sensor signals 2, and 3, 5 (FIG. 4) is determined. The filtered value of the phase shift is compared with the values of the other wheels and stored as basic value (basic offset). When the vehicle is not in constant travel, it is determined in block 81 whether accelerated driving prevails. Accelerated driving exists when the speed increase exceeds a threshold value. Then, a polling is made in blocks 82, 83 whether or not an ESP intervention is being performed. When there is an ESP intervention according to blocks 82, and 83, the introduced (brake) forces are calculated, and the phase signals are compared with those of the load-free or freely running wheels. When the deviations exceed a threshold value, a relative movement between the tire and the rim is concluded, and the phase signal is corrected. When no ESP intervention is determined in block 83, a poll is taken regarding a TCS intervention (block 84). When a TCS intervention prevails, and no ESP intervention is detected in block 82, but an ABS intervention is found in block 85, cases 3 and 5 prevail.

The introduced (brake) forces are calculated and subtracted from the force value of the phase signal (=longitudinal force). The basic offset of the phase signal is corrected by way of model-based estimated forces and the (negative) acceleration. The corrected basic value is used to calculate the phase signal until the driving situation constant driving is reached. When no TCS intervention is found in block 84, normally accelerated driving according to case 2 prevails. The acceleration caused by the drive torque and the forces are determined, and the basic value of the phase signal is corrected in relation to the forces and the acceleration. When, on the other hand, it is determined in block 85 that there is no ABS intervention, case 4, (i.e., normally decelerated driving) is assumed. The deceleration and the forces are estimated in a model-based way, and the basic value of the phase signal is corrected in relation to the forces and the deceleration.

What is claimed is:

1. A method of operating an automotive vehicle control system, said vehicle control system of the type including an electronic evaluating circuit with at least two control functions, a plurality of tires, wherein each tire includes a tire sensor with at least one corresponding pick-up and wherein each tire also includes at least one encoder applied to a wall of the tire, and at least one conventional rotational speed sensor mounted on each wheel of each tire, wherein an output signal of the tire sensor and an output signal of the at least one conventional sensor are correlated and evaluated in said electronic evaluating circuit to determine vehicle condition variables by the forces that act on the individual wheels and tires, comprising the steps of:

A) collecting the output signals of at least one of the tire sensors and of at least one of the conventional wheel speed sensors, B) testing the output signals of the at least one tire sensor and of the at least one conventional sensor for correctness with respect to the output signals of one or more of the remaining conventional sensors and tire sensors in order to determine an accurate representation of the actual vehicle's wheel rotational speeds, and C) detecting, within a predetermined period, a deviation beyond a predetermined threshold between the at least one tire sensor signal and the at least one conventional sensor signal, D) using the at least one tire sensor signal or the at least one conventional sensor signal to generate one or more correction factors for correcting the output signals of one or more of the remaining conventional sensors and time sensors or for correcting vehicle condition variables derived therefrom, and adapting a control logic based upon the corrected output signals.

2. Automotive vehicle control method as claimed in claim 1, wherein said step of adapting the control logic includes the step of automatically changing over from a first control function to an ABS control function.

3. Automotive vehicle control method as claimed in claim 1, wherein said step of adapting the control logic further includes determining whether the output signals lie in a predetermined tolerance band.

4. Automotive vehicle control method as claimed in claim 1, further including the step of scanning the encoder to determine whether the at least one of said tires is designed with a tire sensor.

5. Automotive vehicle control method as claimed in claim 1, wherein the encoder is designed as a ring that is comprised of magnetic areas or poles applied to the tire side wall.

6. Automotive vehicle control method as claimed in claim 5, wherein the poles are magnetic and are evenly distributed over a periphery of the tire.

7. Automotive vehicle control method as claimed in claim 1, wherein the testing of the output signals of the tire sensor and the conventional sensor further includes the step of detecting a relationship between each signal.

8. Automotive vehicle control method, as claimed in claim 1, said step of generating one or more correction factors including determining or compensating for a shift of a phase position between the tire sensor signal and the one conventional sensor signal, and wherein said compensating step is effected during one or more predetermined driving conditions.

9. Automotive vehicle control method, as claimed in claim 1, wherein the testing of signals for correctness further includes the step of executing a learning method during times of stable driving conditions.

10. Automotive vehicle control method as claimed in claim 9, wherein said stable driving conditions includes at least one of the following conditions:
- driving at a constant speed, acceleration of one wheel,
- TCS intervention, deceleration of one wheel,
- ABS intervention, and
- ESP intervention on at least one wheel.

11. Automotive vehicle control method, as claimed in claim 8, further including the step of: sensing and storing a basic value for the phase position shift while said vehicle is traveling at constant speed.

12. Automotive vehicle control method as claimed in claim 11, further including the step of: modifying the basic value depending on at least one of the driving conditions by determining the acceleration and the braking forces during positively or negatively accelerated driving.

* * * * *